Patented June 2, 1936

2,042,952

UNITED STATES PATENT OFFICE 2,042,952

SULPHONATED PRODUCTS AND PROCESS OF PRODUCING THEM

Ernst Alfred Mauersberger Maarssen, near Utrecht, Netherlands, assignor to The Richards Chemical Works, Jersey City, N. J., a corporation of New Jersey No Drawing. Application August 7, 1933, Serial No. 684,118. In Germany November 2, 1932

22 Claims. (Cl. 260—159)

This invention relates to new sulphonated products having capillary activity, and especially to products of this kind arising from the esterification of the hydroxyl groups of aliphatic alcohols having at least 8 carbon atoms in the molecule by the action of certain acids, and from the subsequent sulphonation of these esters or from the neutralization of the products of sulphonation. The invention further relates to processes for making these products, and includes also the application of them to certain purposes.

The processes hitherto known for producing sulphonic esters of the alcohols corresponding to the fatty acids are subject to the defect that to get readily soluble sulphonates it is necessary to work at low temperature and with a great excess of the sulphonating reagent, or else to employ expensive anhydrides, as acetic anhydride or phosphoric anhydride. Moreover solvents are often needed in sulphonating saturated alcohols. The excess of sulphonating reagent, or the anhydride added, which in sulphonation is converted into the corresponding acid, must be neutralized or separated by further treatment. Hence large amounts of neutralizing agents or washing media are required, and a great deal of inactive sulphate mostly Glauber's salt, is produced. Consequently the final product has but a small content of alcohol sulphonate. Moreover the heat of reaction evolved is liable to decompose the ester formed into its components. Finally, if it is desired to obtain high percentage products, complex and costly methods of extraction have to be employed which often damage the final product.

The soap-like media hitherto known, produced from esters of the aliphatic alcohols with other inorganic acids than sulphuric acid are subject to the defect that they are insoluble in water and therefore require the addition of an emulsifying agent if they are to be employed in the after treatment of textiles for brightening color, the purpose for which they are particularly intended.

It has now been found that all these difficulties may be avoided by first forming esters from the hydroxyl groups of primary, secondary or tertiary aliphatic alcohols, whether saturated or unsaturated, having from 8 to 30 carbon atoms in the molecule, by means of inorganic acids having unvolatilizable anhydrides, and then sulphonating these esters with one of the known sulphonating reagents, preserving the inorganic ester group. Of these acids, boric acid is particularly to be considered because of its extraordinarily good properties of esterification, and its low price. For if phosphoric acid were used the alcohol would decompose, forming hydrocarbons; nitric acid causes the formation of fatty acids; while sulphuric acid gives black products of decomposition and polymerization.

All kinds of aliphatic primary, secondary or tertiary alcohols, monovalent or polyvalent, having at least 8 carbon atoms in the molecule may be employed in this process, including:

(1) natural saturated or unsaturated alcohols such as may be produced from the well known waxes;

(2) synthetic alcohols obtainable by hydrogen of fatty acids;

(3) synthetic alcohols obtainable by reduction of hydroxy fatty acids;

(4) synthetic alcohols obtainable from olefines derived from the cracking of petroleum;

(5) the above alcohols, with halogen groups introduced;

(6) synthetic alcohols obtainable from the chlorine derivatives of the higher and high molecular weight hydrocarbons of the paraffin series, the chlorine being partially or wholly replaced by unsaturated compounds and hydroxyl groups by treatment with caustic alkalies under pressure.

The esterification of the aliphatic alcohols by boric acid is subject to the maintenance of certain working conditions for otherwise no esterification occurs or the esterification is incomplete. For instance the boric acid may simply dissolve in the alcohol without esterfication. Or if the process is not properly carried out boric acid anhydride or meta-boric acid may be formed, and there may be temporary solution and only partial esterification. In these cases the products obtained do not give a clear fluid upon melting, even after a few days, but a cloudy or milky melt from which boric acid anhydride or pyro-boric acid deposits in the form of hard crystals. Any attempt subsequently to sulphonate these products causes separation of boric acid.

The procedure for getting satisfactory products is preferably as follows. The alcohol is first treated with the theoretically requisite amount of ordinary commercial boric acid (1 molecule of $H_3BO_3$ to 3 molecules of alcohol), and the temperature is slowly raised, while the mixture is stirred, to over 100° C. according to the kind of alcohol used. The bulk of the water produced by the reaction distils over together with a small part of the boric acid. As soon as all the boric acid has gone into solution esterification is completed in vacuo at about 150° C. With this method of operation the final product as a rule contains no appreciable amount of unconverted alcohol. If desired any residue of unconverted alcohol may be distilled off at a higher temperature in a good vacuum.

Since this last step may in some circumstances somewhat impair the color of the ester, especially if the initial material is an unsaturated alcohol, it is preferable to use somewhat more boric acid than is theoretically necessary. Ortho-boric acid ester is then formed which has the particular advantage that its point of solidification is substantially lower than that of the corresponding alcohol.

If one molecule of H₃BO₃ be used to one molecule of alcohol the metaboric acid ester is obtained. It is preferable to use somewhat less boric acid to make sure that there shall be no free boric acid left in the finished ester.

In this way both the ortho- and meta-boric acid esters may be obtained as well as intermediate steps between them which apparently consist of mixtures of the compounds named. Ortho-boric acid esters have a low melting point and are very stable, while the meta-boric esters as a rule have a higher melting point and in course of time even in the solid state there is a tendency for boric acid to separate out with a partial conversion to ortho-borate.

The following table gives the temperatures of solidification of certain alcohols which may be used for making compounds in accordance with this invention and of their ortho and meta-boric acid esters.

| | |
|---|---|
| Alcohol from spermaceti | about 45° C. |
| Ortho-boric acid esters of these alcohols | about 35° C. |
| Meta-boric acid esters of these alcohols | about 55° C. |
| Alcohols from the body oil of the sperm whale | about 29° C. |
| Ortho-boric acid esters of these alcohols | about 18° C. |
| Meta-boric acid esters of these alcohols | about 35° C. |

Sulphonation of these esters may be effected with known anhydrous sulphonating reagents, for instance with ordinary commercial concentrated sulphuric acid of 66° Bé., or with Nordhausen sulphuric acid, chloro-sulphonic acid or other sulpho acids. It is preferably conducted at a somewhat raised temperature, best about 45 to 60° C. Sulphonates are then obtained which on neutralization form very light colored products. Approximately the theoretically necessary amount of the sulphonating reagent is employed for sulphonating and can therefore be calculated. Account must be taken of the molecular weight and the number of hydroxyl groups present in the alcohol used as the initial material. In the case of unsaturated alcohols the iodine number must also be taken into consideration. For each hydroxyl group contained in one molecule of the alcohol prior to esterification with boric acid one molecule of sulphuric acid is required. In addition for an iodine number of, for instance, 100, a further 38 parts of sulphuric acid are needed per 100 parts of boric acid ester.

Experience has, however, shown that the theoretically necessary amount of the sulphonating reagent is not always essential for the obtainment of soluble sulphonates. Sometimes quite a small amount suffices.

For sulphonating the ortho-boric acid ester of secondary decyl alcohol, which is readily obtainable from decene produced in the cracking of petroleum, 45% of H₂SO₄ is sufficient to give solubility in water instead of the theoretical amount of 62%.

It does not matter whether the boric acid ester is run into the sulphuric acid or the converse. But in the first case a small excess of sulphuric acid is desirable.

In saturated alcohol-boric acid esters the sulpho group attaches to the carbon atom which forms part of the ester with the boric acid group and apparently it is attached to the ester. In unsaturated alcohol-boric acid esters sulphonation of the unsaturated bond occurs first. On further sulphonation the sulpho group apparently attaches to the carbon atom which has already formed an ester with boric acid.

If sulphonation is interrupted at the instant when the sulphuric acid has attached only to the unsaturated bond, sulphonates are obtained which dissolve in water giving a thick milky-white color, that is to say they form an emulsion which, however, is very stable and will even withstand boiling. These so-called half-sulphonates are to be regarded both in acid and neutral form as typical fatty bodies in a colloidally soluble form. They can be used in a 10 to 15% emulsion with water directly as a spinning melt without any addition of olein, while if olein is used as well the percentage can be still further reduced. The half sulphonates are also excellent dulling media and softening media for finishing textiles, particularly artificial silk.

While the temperature as a rule noticeably rises during sulphonation of pure aliphatic alcohols much less rise of temperature is observable when boric acid esters are used. There is also a much less rise of temperature when unsaturated boric acid esters are used so that the sulphonation takes substantially less time.

The full sulphonates of the alcohol borates are excellent foaming media, washing media, damping media, impregnating, dispersing, cleaning and polishing media, and have an extraordinarily wide range of application. They are useful, for example, in the textile industry, the leather industry, in the hide industry, and in the paper industry; also for household purposes, serving for cleaning crockery, as plates, dishes, knives, forks, and spoons, and for washing household laundry, carpets, furniture and so on. They may further be used as cleaning and polishing media for metals; as cosmetics, for example as shampoo and hair-wash; as media for fire-extinguishers instead of saponine. Briefly, they are almost universally employable.

Since the boro-sulphonates are to a high degree resistant alike to acids and alkalies they can be employed in acid or alkaline solutions. It is chiefly the saturated boro-sulphonates of high molecular weight that are applicable as foaming and wetting agents. The boro-sulphonates of the saturated alcohols of high molecular weight serve excellently as wetting or dispersing agents; while the full boro-sulphonates of the unsaturated alcohols have extraordinarily good properties as washing media, fat solvents and wetting agents. Both the saturated and unsaturated boro-sulphonates can be used as metal polishes, but it is preferable to use the meta-borates, since these more readily dissolve metal oxides.

The boro-sulphonates of the saturated alcohols are formed as powders, while those of the unsaturated alcohols appear as pastes.

Acid boro-sulphonates may be neutralized in known manner with alkalies, ammonia or other amides, for example by running the sulphonate at a low temperature into a 30–40% soda lye or other neutralizing medium, treating it first with a small quantity of chlorinated hydrocarbon to obtain better solubility. The sulphonate may also be first diluted with ice and then neutralized with alkali solutions. Or the boro-sulphonate may be converted into the neutral sodium salt by grinding it with dry sodium carbonate or soda, the temperature being best kept, as a rule, below 25° C.

Boro-sulphonates of the saturated alcohols when in acid condition, that is as sulpho acid compounds, are reddish wax-like substances readily soluble in water, alcohol, ether, chloroform and so forth. They have a strong acid reaction and as a rule have the same melting point as the alcohol employed as the raw material. The sodium salts of these boro-sulpho-acids are white powders, very readily soluble in hot water. Some of them have melting points above 100° C., the melting point depending on the size of the molecule.

Boro-sulphonates of unsaturated alcohols in acid condition have similar properties to those of the saturated alcohols. The sodium salts melt at a substantially lower temperature, they are satisfactorily soluble in cold water, are white in color, and odorless.

Boro-sulphonates of alcohols made in various ways from hydrocarbons are yellow oils or viscous fluids, which both in the acid and in the neutral form very readily dissolve in cold water.

*Example 1*

250 k. g. of sperm oil alcohols are slowly heated to 130° C. with 22 k. g. of ordinary commercial boric acid in powder form, at first without vacuum, and water passes off. The temperature is then slowly raised to 220° C. under vacuum. With a vacuum of 2 m. m. Hg. the alcohols which have not reacted distil off at this temperature. As soon as nothing more distils over the contents of the still are cooled to 50° C. under vacuum. The ester formed has almost the same color as the initial material, and is the ortho-boric acid ester of the sperm oil alcohols, that is to say chiefly of oleic alcohol.

100 k. g. of this ester is sulphonated at temperatures up to 60° C. by some 55 k. g. of a 10% Nordhausen sulphuric acid, the temperature being initially about 45° C. and rising towards the end of sulphonation to 55–60° C. The sulphonate is then cooled to 30° C. and transferred about 1 k. g. at a time to a strongly cooled soda lye consisting of 26 k. g. of caustic soda (NaOH) in 24 litres of water. A paste is produced, which is about a 45% product reckoning on the basis of the fatty alcohol.

This product is an excellent scouring agent. For scouring raw wool a ½% bath is used at 50–60° C. It is best to scour first in a used bath, then put into a fresh bath and rinse. For washing laundry of all sorts a ¼ to ½% bath is employed in a washing machine at about 70° C. For washing up in the kitchen a little of the product is added to the washing water, dissolved, and the crockery and so forth rinsed with it at about 50° C. The articles acquire a high polish. For soaking and softening hides of all kinds without depilating ½ to 1 part of the sulphonate is added per thousand parts of the tanning bath. Hides so treated are particularly soft.

*Example 2*

250 k. g. of sperm oil alcohols, such as may be got in well known manner from sperm blubber oil are converted to esters by 25 k. g. of ordinary commercial boric acid as in Example 1. As there is already a slight excess of boric acid, to form ortho-boric acid esters, it suffices to heat the ester to 160° C. in a vacuum of 24 m. m. Hg. As soon as the contents of the retort cease to boil esterification is complete. The product is the ortho-boric acid ester of cetyl alcohol.

For sulphonation 100 k. g. of this ester is stirred into 25 k. g. of cold 98% sulphuric acid, the temperature being kept between 45 and 60° C. so that only the unsaturated bond is sulphonated. This half sulphonate is stirred into a soda lye of 12 k. g. of caustic soda (NaOH) in 12 litres of water; care should be taken that the temperature does not rise above 20° C.

This half sulphonate forms a milky solution in water, and a thick stable emulsion. A 15% emulsion of it may usefully be employed as a spinning melt or size in weaving. If olein is added a 7% emulsion is employed, and 10% of olein is stirred into it.

*Example 3*

In accordance with Example 2, 250 k. g. of oleic alcohol is converted into ester by 62 k. g. of crystallized boric acid. The product is the meta-boric acid ester of the oleic alcohol. 100 k. g. of this ester are sulphonated in known manner with 38 k. g. of concentrated sulphuric acid, the sulphuric acid merely entering the unsaturated bond. Neutralization is effected with 21 k. g. of NaOH in 22 litres of water.

This half sulphonate forms a thick milk with water. It is an excellent dulling agent for artificial silk, and gives it a soft feel.

To take the undesired gloss from artificial silk and at the same time impart a soft feel a finishing treatment is employed consisting in a one hour transit through a warm 10% solution of this sulphonated meta-boric acid ester of sperm oil alcohol. A fuller feel can be got by adding 2–5% of amides of the saturated fatty acids, cholesterols, as for example isocholesterol, waxes or the like.

*Example 4*

240 k. g. of cetyl alcohol, obtained in known manner from spermaceti, is subjected in a vacuum boiler to esterification by 62 k. g. of ordinary commercial boric acid as in Example 1. As complete esterification occurs, meta-boric acid cetyl ester being formed, heating to 220° C. under a high vacuum is not necessary; it suffices to heat to 150° C. with a vacuum of 24 m. m. Hg. Esterification is complete as soon as bubbles cease to rise from the ester.

100 k. g. of this ester in the form of a cold pulp is run slowly into 50 k. g. of concentrated sulphuric acid, the temperature not being allowed to exceed 60° C. nor fall below 45° C. Immediately after sulphonation the sulphonate, which is still fluid at 45° C., is run into 50 k. g. of a 10% ice-cold solution of Glauber's salt, care being taken to prevent the formation of lumps and to stir the sulphonate to a uniform pulp with the salt solution. The temperature should not rise above 25° C. Neutralization is then effected at 25° C. by thorough stirring with 24 k. g. NaOH dissolved in 25 litres of water. A 40% sulphonate is obtained which after a day's exposure to warm dry air can be ground to a fine powder.

The sulphonate obtained is a good damping, washing and foaming medium, to be used in a 0.1% solution for damping, and in a 0.2–0.5% solution for washing. A 0.1% solution of it may be added as a dispersing agent to dyeing baths.

*Example 5*

In accordance with Example 1 ortho-boric acid ester of dodecyl alcohol is made from 100 k. g.

of dodecyl alcohol and 13 k. g. of boric acid. 100 k. g. of this ester are sulphonated in accordance with Example 1 by 45 k. g. of concentrated sulphuric acid, and the sulphonate is neutralized at temperatures up to 15° C. with 22 k. g. of caustic soda dissolved in 24 litres of water. Lauric boro-sulphonate is obtained in powder form.

This sulphonate is a very good wetting and foaming medium, and also has a good scouring action. For wetting textiles it is used in a 0.1–0.25% solution.

To make a good foam producing agent suitable for the well known hand fire-extinguishers, a solution of 15 parts of lauric boro sulphonate, 10 parts of Glauber's salt, and 75 parts of 25% sulphuric acid is employed, which in case of fire is sprayed by the pressure of carbon-dioxide produced by mixing it with a concentrated solution of carbonate of soda. A great deal of foam is produced like that of saponine.

Example 6

To produce a good lathering shampoo which will make the hair lissom and soft and impart a silky gloss to it, lauric ortho-borate is first formed as in Example 5. This is sulphonated, as already described, with 45 k. g. of concentrated sulphuric acid. The acid boro-sulphonate so obtained is thoroughly mixed cold with an equal quantity of bicarbonate and allowed to stand for a day. There is a little foaming and a loose white powder forms which is sifted. This may be mixed, if desired, with more sodium bicarbonate with almond powder, perfumes and so forth.

The powder has extraordinary foam forming action and washing action. It is readily soluble in cold water.

Example 7

100 kg. of monochlorhexadecanol, which may be made by chlorinating cetyl alcohol, is subjected to esterification under high vacuum as in Example 2, by 23 kg. of ordinary commercial boric acid, producing chiefly monochlorcetyl-meta-boric acid ester. None of the alcohol remains unconverted in the ester. After esterification the product is cooled to 30° C.

100 kg. of this ester are sulphonated as already described with about 35 kg. of concentrated sulphuric acid at 33° C. The resulting mass is diluted with ice and neutralized in known manner.

The product has excellent wetting and washing properties, and adequate foam forming action. As a result of the introduction of the chlorine group into the molecule it is distinguished by better solubility in cold water as compared with the boro-sulphonate of cetyl alcohol.

0.1–1% solutions of it may be employed in baths for textiles, washing liquors and cleaning baths for household use.

Example 8

A good hair wash is obtained by dissolving in 99 parts of water 0.5 parts of the product of Example 5 (lauric boro-sulphonate) and 0.5 parts of the product of Example 7 (monochlorcetyl-boro-sulphonate), adding perfume to taste and filtering.

Example 9

100 kg. of the alcohols of wool fat substantially freed from cholesterol, and comprising carnaubyl alcohol, ceryl alcohol, lanolinic alcohol and a little cetyl alcohol, are wholly converted into esters by treatment with 18 kg. of ordinary commercial boric acid at 150° C. under a high vacuum, as in Example 2. The main product is the meta-boric esters of these alcohols.

100 kg. of the esters are sulphonated in known manner with 50 kg. of highly concentrated sulphuric acid at temperatures of about 50 to 60° C. Since in the case of these esters of high molecular weight the sulpho acids form with difficulty, a strong current of chlorine is led into the sulphonating mixture until it becomes soluble in warm water. Hydrochloric acid is given off. Any hydrochloric acid yet retained in the solution, which would do harm, is driven off by blowing in dry air. The mass is then diluted with ice and neutralized in known manner.

The product is suitable for soaking baths in the leather industry; it has good dispersive properties.

Example 10

100 kg. of secondary alcohols of high molecular weight having 8 to 12 carbon atoms in the molecule, which may be readily produced from the corresponding unsaturated hydrocarbons in the cracking of petroleum, are converted into ester according to Example 1 by 18 kg. of boric acid, producing the ortho-boric acid esters of these alcohols.

100 kg. of these boric esters are sulphonated at 45° C. by 45 kg. of concentrated sulphuric acid, and the sulphonate is neutralized at 15° C. by 50 kg. of a 40% soda lye.

The neutral boro-sulphonate so produced is an excellent wetting and foam forming medium, applicable as a 0.1–0.5% solution in the textile, leather and paper industries.

Example 11

A metal polish for polishing copper, bronze, brass, aluminium, steel, and noble and semi-noble metals and articles made of them consists of a mixture of the products of Examples 4 and 7. It may be used in acid or neutral form or made slightly alkaline by addition of soda.

A 1% solution in warm water is employed and the articles are polished with a soft brush. The surface is instantly cleaned and acquires a sheen. The articles should be rinsed with clean water and dried.

Example 12

100 kg. of a product obtained by treating chlorinated paraffin with an alcoholic aqueous solution of soda under pressure, and which contains at least one unsaturated bond and one hydroxyl group, together, may be, with chlorine groups, is converted into ester by 8 kg. of boric acid in known manner in accordance with Example 2.

The borate obtained is sulphonated by thorough stirring with 45 kg. of concentrated sulphuric acid or 60 kg. of ethyl sulphuric acid at 45 to 60° C., the borate being preferably run into the sulphuric acid or alkyl sulphuric acid. After sulphonation neutralization is effected with a 40% soda solution.

The product has extraordinary power of washing and of dissolving fats, and may be used as a soap for textiles in combination with lauric boro-sulphonate. By itself it is a good emulsive, and acts excellently as a colloid protector.

I claim:—

1. As a new composition of matter, the sulphonation product of a boric acid ester of an aliphatic alcohol having at least eight carbon atoms in the molecule.

2. As a new composition of matter, the sulphonation product of a boric acid ester of an aliphatic alcohol hydrogenation derivative of a fatty acid, said alcohol having at least eight carbon atoms in the molecule.

3. As a new composition of matter, the sulphonation product of a boric acid ester of an aliphatic alcohol product of the reduction of hydroxy fatty acids, said alcohol having at least eight carbon atoms in the molecule.

4. As a new composition of matter, the sulphonation product of a boric acid ester of an aliphatic alcohol from an olefine derived from the cracking of petroleum, said alcohol having at least eight carbon atoms in the molecule.

5. As a new composition of matter, the sulphonation product of a boric acid ester of an aliphatic alcohol containing a member of the halogen group and at least eight carbon atoms in the molecule.

6. As a new composition of matter, the sulphonation product of a substance selected from the class consisting of the orthoboric acid ester, the metaboric acid ester and intermediate boric acid esters of an aliphatic alcohol having at least eight carbon atoms in the molecule.

7. As a new composition of matter, the sulphonation product of a boric acid ester of an aliphatic alcohol containing at least one unsaturated bond and having at least eight carbon atoms in the molecule, in which product the unsaturated bond only is sulphonated.

8. As a new composition of matter, a sulphonated boric acid ester of an aliphatic alcohol containing at least eight carbon atoms in the molecule, neutralized by a neutralizing medium of the class consisting of alkali-metal hydroxides, amides, and bicarbonates of the alkali-metals.

9. The herein described process of producing sulphonation products, which process comprises treating an aliphatic alcohol containing at least eight carbon atoms in the molecule with boric acid to form a boric acid ester of said alcohol, and sulphonating said ester.

10. The herein described process of producing sulphonation products, which process comprises treating an aliphatic alcohol containing at least eight carbon atoms in the molecule with boric acid, stirring said mixture and slowly raising the temperature thereof until the boric acid has gone into solution thereafter subjecting the mixture to treatment in vacuo at a higher temperature than that previously prevailing to complete formation of a boric acid ester of said alcohol, and sulphonating said ester.

11. The herein described process of producing sulphonated products, which process comprises treating an aliphatic alcohol containing at least eight carbon atoms in the molecule with boric acid to form a boric acid ester of said alcohol and treating said ester with an anhydrous sulphonating reagent selected from the class consisting of concentrated sulphuric acid, fuming sulphuric acid, chloro-sulphonic acid, and sulpho acids having one valency satisfied by an organic group.

12. The herein described process of producing sulphonated products, which process comprises treating an aliphatic alcohol containing at least eight carbon atoms in the molecule with boric acid to form a boric acid ester of said alcohol, sulphonating said ester and introducing chlorine into the ester during the sulphonation thereof.

13. The herein described process of producing a neutralized sulphonation product, which process comprises treating an aliphatic alcohol containing at least eight carbon atoms in the molecule with boric acid to form a boric acid ester of said alcohol, treating said ester with an anhydrous sulphonating agent, and neutralizing said sulphonated ester with a neutralizing agent selected from the class consisting of alkali-metal hydroxides, amides, and bicarbonates of the alkali-metals.

14. The herein described process of producing sulphonation products, which process comprises treating with sulphuric acid of sulphonating strength the meta-boric acid ester of an aliphatic alcohol containing at least eight carbon atoms in its molecule.

15. The herein described process of producing neutralized sulphonation products, which process comprises forming a meta-boric acid ester of aliphatic alcohol having at least eight carbon atoms in its molecule, treating the ester with sulphuric acid in the proportion by weight of approximately 38 parts of concentrated sulphuric acid to 100 parts of the ester, and neutralizing the product.

16. The herein described process of producing neutralized sulphonation products, which process comprises treating with sulphuric acid of sulphonating strength an ortho-borate of lauric alcohol and neutralizing the product.

17. The herein described process of producing neutralized sulphonation products, which process comprises treating lauric alcohol with ortho-boric acid to form lauric orthoborate, treating the latter with sulphuric acid in the proportion by weight of approximately 45 pounds of concentrated sulphuric acid to 100 pounds of the orthoborate, and treating the sulphonation product with sodium bicarbonate.

18. The herein described process of producing neutralized sulphonation products, which process comprises treating monochlorcetyl metaboric acid ester with sulphuric acid of sulphonating strength, and neutralizing the product.

19. The herein described process of producing neutralized sulphonation products, which process comprises esterifying chlorinated cetyl alcohol with boric acid, sulphonating the ester so formed, and neutralizing the sulphonation product.

20. The herein described process of producing neutralized sulphonation products, which process comprises treating with sulphuric acid of sulphonating strength an orthoborate of a substance selected from the class consisting of sperm oil alcohols, cetyl alcohol, oleic alcohols, dodecyl alcohol and wool fat alcohols, and neutralizing the resulting product.

21. As a new composition of matter, sulphonated lauric orthoborate neutralized with sodium bicarbonate.

22. As a new composition of matter, the sulphonation product of monochlorcetyl metaboric acid ester.

ERNST ALFRED MAUERSBERGER.